Aug. 26, 1969   Y. R. BRATKOWSKI   3,463,569
REAR PROJECTION SCREEN
Filed Oct. 22, 1965   9 Sheets-Sheet 1

Inventor
Yaroslaw R. Bratkowski
By Cushman, Darby & Cushman
Attorneys

Aug. 26, 1969 Y. R. BRATKOWSKI 3,463,569
REAR PROJECTION SCREEN
Filed Oct. 22, 1965 9 Sheets-Sheet 9

Inventor
Yaroslaw R. Bratkowski
By Cushman, Darby & Cushman
Attorneys

United States Patent Office 3,463,569
Patented Aug. 26, 1969

3,463,569
REAR PROJECTION SCREEN
Yaroslau R. Bratkowski, Vancouver, British Columbia, Canada, assignor to A. Freen Limited, Vancouver, British Columbia, Canada, a corporation of British Columbia
Filed Oct. 22, 1965, Ser. No. 500,991
Int. Cl. G03b 21/60, 21/56
U.S. Cl. 350—129                            16 Claims

ABSTRACT OF THE DISCLOSURE

A rear projection screen is provided comprising a plurality of similarly shaped members providing a plurality of pairs of adjacent first and second operative surfaces. These surfaces are spaced from each other to define passageways for light therebetween, and the members and surfaces are constructed and arranged to provide a front and rear face for said screen whereby the screen is capable of simultaneous viewing from both front and rear when a single projector is utilized. The operative surfaces have selected reflectivities and are arranged in selected angular disposition.

---

This invention relates to projection screens of the rear projection type and particularly to rear projection screens also capable of viewing from both front and rear and suitable for viewing in environments having extensive ambient brightness, including daylight conditions.

Rear projection screens per se are those in which an image projected onto one side of the screen is visible upon the obverse side of it.

Most of the prior known projection screens, both of the front and rear projection types involve large degrees of diffusion and for this reason such screens exhibit a fairly large deterioration of the brightness of the image seen and/or a deterioration of the image contrast ratio obtainable. Further, the prior known screens exhibit a further loss of brightness and contrast ratio when the viewer moves away from the centre line of the screen and projector and a similar loss in brightness and contrast occurs when the screen is subject to a fair amount of parasitic lighting on its reflective surface.

The present invention envisages a rear projection screen capable of both front and rear viewing which permits parasitic light to pass through the screen, either from the front or the rear without any substantial amounts of such parasitic light being reflected into the eyes of the viewers.

The rear projection screen according to this invention transmits images through the screen by reflection, rather than by the more usual interception of image forming rays by means of a translucent medium. The screen also diffuses the image to render it visible to all viewers viewing the screen from the front and under certain circumstances from the rear. The invention in particularly enjoys an attractive property in that virtually all parasitic light directed onto the front of the screen is permitted to pass by reflection through the screen to the rear rather than forward into the eyes of the viewer. The nature of the screen envisaged in the present invention is such that the image produced by the screen is confined within discrete areas both in front and in the back having the boundaries outside of which practically no remnants of the image migrate and, therefore the images produced are of relatively high brightness. It will be appreciated that if the degree of diffusion contemplated is relatively small then the image quality or resolution will not be reduced to the extent experienced with full diffusion types of projection screens.

It is an object of one aspect of the invention to provide a rear projection screen suitable for use in high ambient illumination environments.

In accordance with the foregoing aspect the invention comprises: an optical screen for use in a rear projection type system comprising a plurality of similarly shaped members providing a plurality of pairs of adjacent first and second operative surfaces the latter being spaced apart in face-to-face relationship, said surfaces having a pair of longitudinal marginal edges collectively defining, respectively, a front and a rear face of said screen, all of said first surfaces being disposed at a selected angle to one of said faces, and all of said second surfaces being similarly inclined at an angle complementary to the angle of the first surfaces, said first and second operative surfaces having selected reflectivities.

A preferred embodiment of the invention will now be described with reference to the accompanying drawings, in which.

Figure 1:
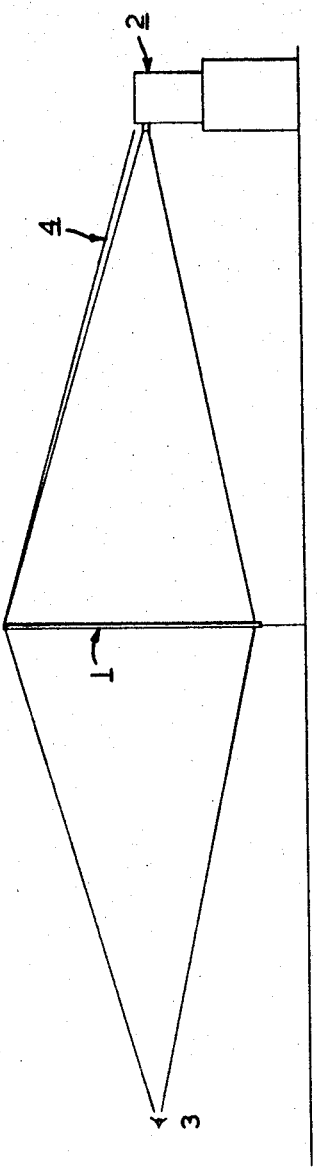
FIG. 1 is a diagram showing the conventional layout for a rear projection system.

Referring now to FIG. 1, there is shown a rear projection screen 1, a projector 2 and a viewer 3. In some circumstances, the space between the screen 1 and the projector 2 may be enclosed by a light shield (4). Such will be the case when rear viewing is not required.

Figure 2:
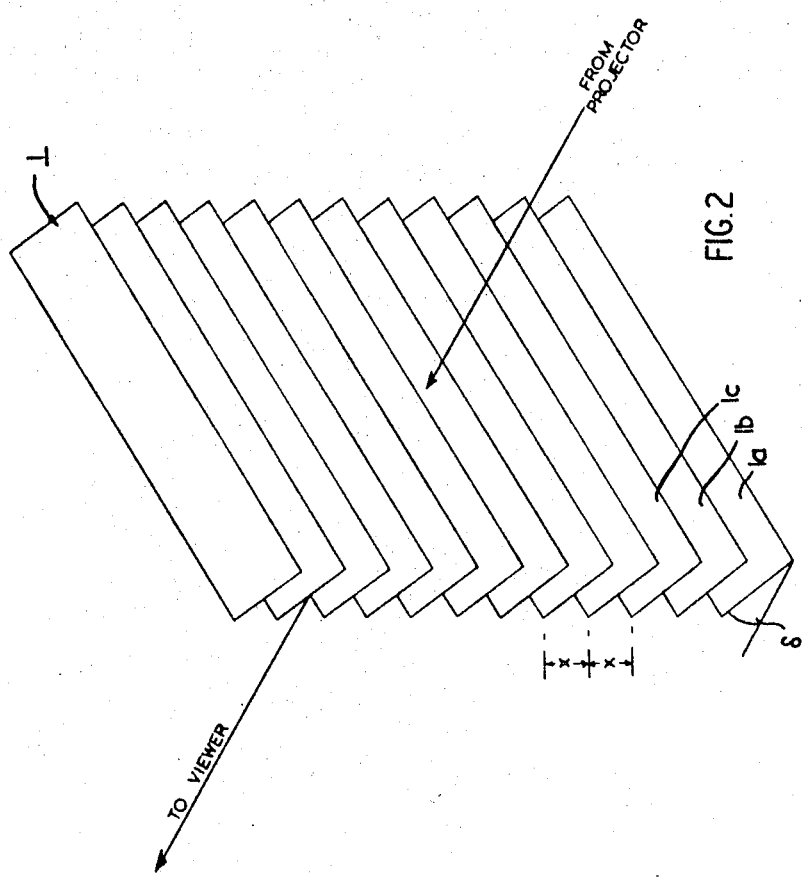
FIG. 2 is an isometric view of a section of a rear projection screen in accordance with the present invention.
Figure 10:
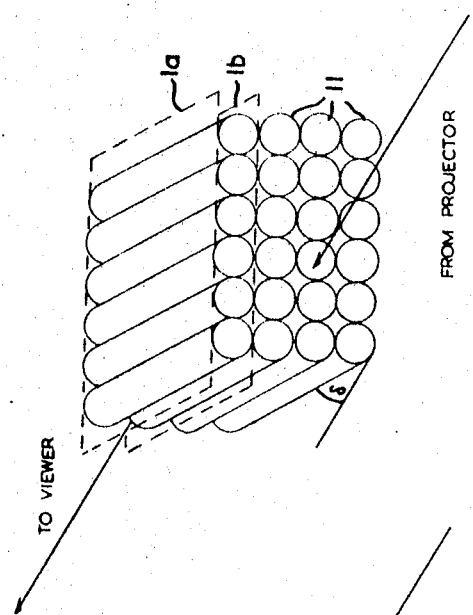
FIG. 10 is similar to FIG. 9 but shows the use of circular tubes.
Figure 9:
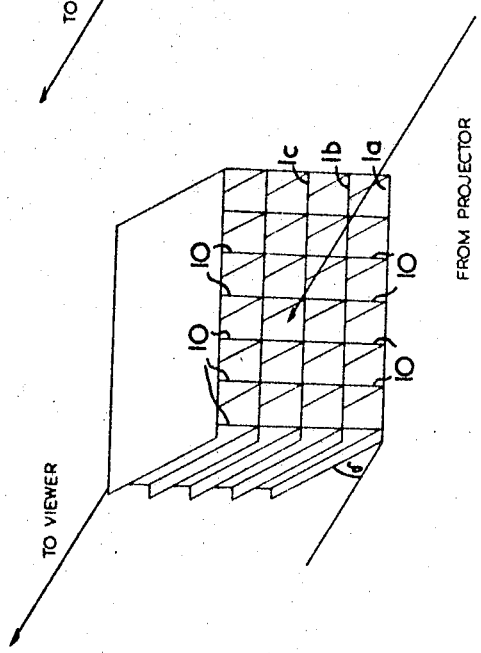
FIG. 9 is a further embodiment of the present invention employing a matrix of tubes having rectangular cross-section instead of a collection of parallel strips.

Referring now to FIG. 2, it should be understood that in all further references to "screen" except in FIGS. 9 and 10 it is intended to imply that the screen comprises a cascade of strips 1a, 1b, 1c, etc. It will be seen in FIG. 2 that the screen in accordance with the present invention, comprises such a cascade of strips 1a, 1b, 1c, etc., which are both co-extensive and parallel to one another and separated by a vertical distance equal to $x$ and each inclined to the horizontal by an angle identified as $\delta$. It will be seen that the upper edge of each strip is disposed towards a viewer disposed on the front side of the screen while the lower edge of each strip is disposed towards the projector. Both upper and lower surfaces of the strips 1a, 1b, 1c, etc., are coated with materials of selected reflectivity, although the strips must not have perfectly reflecting mirror surfaces. Ideally, for direct projection and viewing onto and from the screen 1, one selected surface of each strip should be a plane mirror, and the other surface a diffusive surface. However, for oblique viewing, that is viewing away from the centre line drawn between the projector and a viewer, it is necessary that neither surface be a perfect mirror, in order that certain areas on the screen do not appear blank. The reasons for this will be discussed hereafter. The width of each strip may be three times the vertical distance between them.

Figure 3:
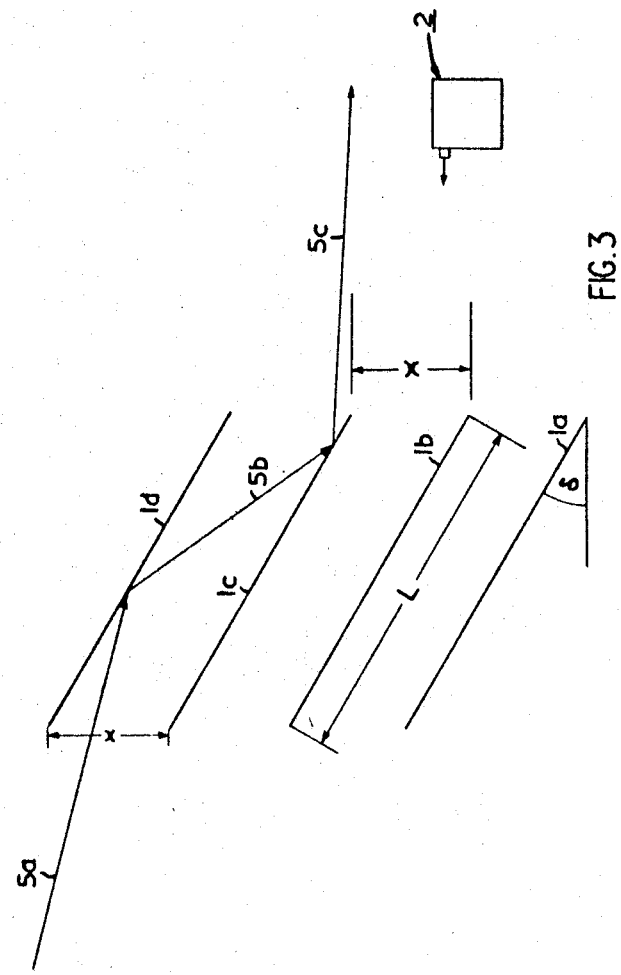
FIG. 3 is a diagram showing the path taken by sunlight in its passage from the front to the rear of the screen.

Referring now to FIG. 3, there are shown a few of the strips 1a, 1b, 1c and 1d. As before, the strips are separated by a vertical distance $x$ and are inclined to the horizontal by an angle $\delta$. The width of each strip is L. In this figure, the observer is located at 3 and the projector at 2. Considering only the effect of parasitic lighting, a such as radiating from a source along a line 5a, it will be seen that the strips 1a, 1b, 1c, etc. are silvered or reflective, so that a parasitic beam 5a will be reflected at the underside of strip 1d along the path 5b and then reflected again at the upper side of strip 1c to emerge from the rear of the screen along a path 5c, and similarly for the other strips. Thus, light incident upon the screen 1 from the front passes through it and is not reflected back into the eyes of the viewer at the front side of screen. It is not possible for a beam of light to pass directly from the projector 2 to the viewer's eye positioned at 3. Instead it strikes the upper surfaces of the strips 1a, 1b, 1c, etc., forming a real image which can be seen by the viewer through a reflection from the lower surfaces of the strips (see reference to FIG. 4.).

If the strips 1a, 1b, 1c, etc., are angled at 30° to the horizontal it will be shown hereinafter that it is necessary that the viewer look downwardly at the screen along a line of sight not more than 11° below the horizontal, or 79° from the plane of the screen, in order that the observer not be able to see directly through the screen.

Figure 4:
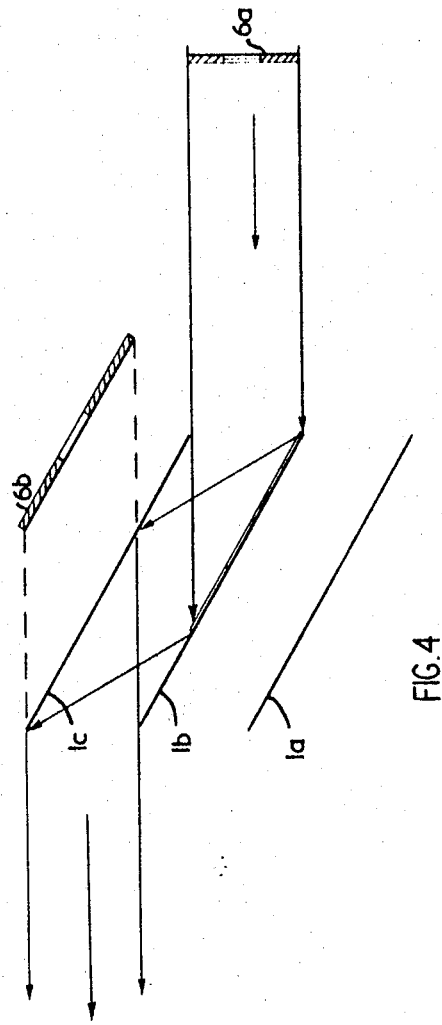
FIG. 4 shows the formation of a virtual image by the screen.

Referring now to FIG. 4 there is shown the same cascade of strips 1a, 1b, 1c, etc., in all respects similar to the cascade in the foregoing figures excepting that each strip has on its underside a mirroring surface and on its upper side a diffusing surface. In this diagram, the line of sight from an observer 3 to the screen 1 is parallel to the light coming from an image formed by the projector at 6a to the screen 1 and further both these directions are perpendicular to the plane of the screen. In this case the image is transmitted without distortion if the upper surface of each strip comprises a diffusing medium and the lower surface of each strip is a mirroring surface. It will be seen that a virtual image is formed at 6b.

Figure 5:
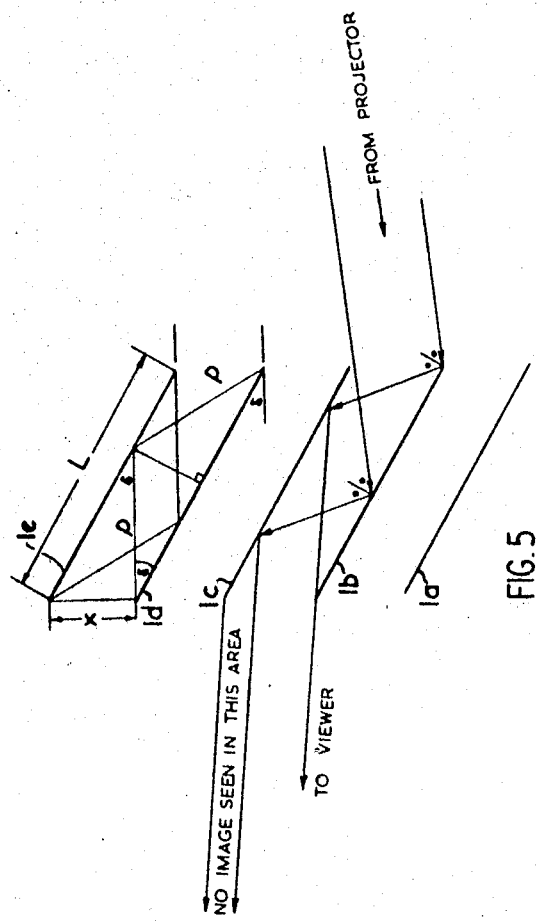
FIG. 5 is a diagram showing the effect of a screen having a purely reflective surface and a diffuse surface.

Referring now to FIG. 5, the strips 1a, 1b, 1c, etc., are similar to those shown in FIG. 4 excepting that the lines of sight from the projector to the screen and from the screen to the viewer are not perpendicular to the screen. In this case, blank areas are seen unless both the upper and lower surfaces of the strips are diffusive. The geometrical designations surrounding the strips 1d and 1e may be disregarded at this junction since they concern the optimisation considerations to be discussed hereinafter. The interruption in the overall image can be minimized by keeping the strips as close together as possible.

In FIG. 5 there are shown the various reflection normals and the critical angles involved in the reflective process which will also be discussed in detail hereinafter. It will be seen in FIG. 5 that the upper and lower surfaces of the strips have the dual function of catching a real image from the projector (requiring a diffusive surface) and reflecting it from one strip to the other (requiring a mirroring surface). Maximum effect is achieved when both surfaces are imperfect mirrors although a desirable effect is also achieved when the upper surfaces of the strips are perfect mirrors and the lower surfaces of the strips are imperfect mirrors.

Referring again to FIG. 5, the optimum relationship between the width of the strips and the vertical distance separating them will now be discussed.

When the lines of sight from the projector to the screen and from the screen to the viewer are each perpendicular to the screen the entire image is transmitted as was shown in FIG. 4, for a certain design condition. The upper part of FIG. 5 indicates the geometry to be considered in finding the optimum relationship between the width of the strips and vertical distance separating each strip.

$\delta$—angle of cant of strips from the horizontal
L—width of strips
X—vertical distance separating strips Simple geometry establishes the identities indicated in the diagram (FIG. 5, upper section).

$$\cos \delta = \frac{\frac{L}{2}}{P} \to P = \frac{L}{2 \cos \delta} \qquad (1)$$

$$\tan \delta = \frac{x}{P} \to P = \frac{x}{\tan \delta} \qquad (2)$$

$$\frac{L}{2 \cos \delta} = \frac{x}{\tan \delta} \qquad (3)$$

$$\boxed{L = 2x \cos \delta \cot \delta} \qquad (4)$$

Figure 6:
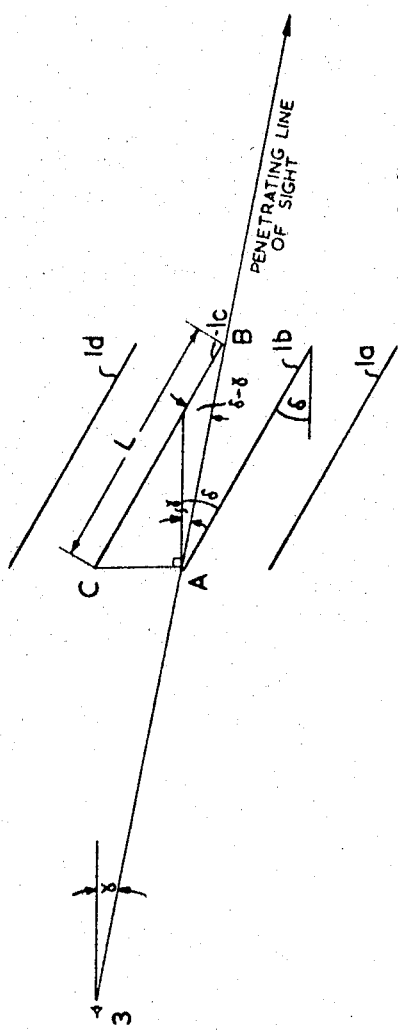
FIG. 6 is a diagram showing the maximum permissable angle of depression from eye to screen.

Referring now to FIG. 6 there is shown a diagram indicating the maximum angle of depression from the eye positioned at 3 through the screen 1. Once again the individual strips 1a, 1b, 1c, etc. are inclined at an angle $\delta$ to the horizontal and the line of sight is depressed below the horizontal by an angle $\gamma$. In a plane normal to the strips the viewing angle should be wide as possible in order that viewers may see the image from a variety of positions. If the viewing angle is greater than the maximum design angle as shown on FIGURE 5, a line of sight from the viewer to the screen will penetrate the screen thus making it impossible to see the projected image.

In FIG. 6 the angle of depression of the viewer's line of sight will now be considered wherein:

$\delta$—angle of cant of strips from horizontal
L—width of strips
$x$—the vertical distance between the strips
$\gamma$—angle of depression The angles indicated on the diagram as shown in FIGURE 6 are determined from basic geometry by use of the sine rule over triangle ABC.

$$\frac{x}{\sin (\delta - \gamma)} = \frac{L}{\sin (90 + \gamma)} \qquad (5)$$

$$\frac{x}{L} = \frac{\sin (\delta - \gamma)}{\sin (90 + \gamma)} = \frac{\sin \delta \cos \gamma - \cos \delta \sin \gamma}{\cos \gamma}$$

$$= \sin \delta - \cos \delta \tan \gamma \qquad (6)$$

But from (3)

$$\frac{x}{L} = \frac{1}{2 \cos \delta \cot \delta}$$

$$\frac{1}{2 \cos \delta \cot \delta} = \sin \delta - \cos \delta \tan \gamma$$

$$1 = 2 \cos \delta \cot \delta \sin \delta - 2 \cos \delta \cot \delta \cos \delta \tan \gamma$$

$$= 2 \cos^2 \delta - 2 \cos^2 \delta \cot \delta \tan \gamma$$

$$\tan \gamma = \frac{2 \cos^2 \delta - 1}{2 \cos^2 \delta \cot \delta} = \frac{\cos^2 \delta}{2 \cos^2 \delta \cot \delta} = \tan \delta - \frac{\tan \delta}{2 \cos^2 \delta}$$

$$(7)$$

$$\boxed{\tan \gamma = \tan \delta - \frac{\tan \delta}{2 \cos^2 \delta}}$$

Taking derivatives and equating $d\gamma/d\delta$ to zero for maximum $\gamma$ $$\sec^2 \gamma \frac{d\gamma}{d\delta} = \frac{1}{\cos^2 \delta} - \frac{2 \cos^2 \delta \sec^2 \delta + 4 \tan \delta \cos \delta \sin \delta}{4 \cos^4 \delta}$$

$$\sec^2 \gamma \frac{d\gamma}{d\delta} = \frac{4\cos^2 d - 2 - 4\sin^2 \delta}{4\cos^4 \delta} = \frac{4\cos 2\delta - 2}{4\cos^4 \delta}$$

$$\frac{d\gamma}{d\delta} = \frac{4\cos 2\delta - 2}{4\cos^4 \delta \sec^2 \gamma} = 0 \bigg]_{\gamma = \max.}$$

$$\rightarrow 4\cos 2\delta - 2 = 0 \bigg]_{\substack{\cos \delta \neq 0 \\ \sec \gamma \neq 0}}$$

$$\cos 2\delta = \frac{1}{2}$$

$$2\delta = 60°$$

$$\delta = 30° - \text{optimum } \delta \text{ for minimum } \gamma$$

from (7) $\tan \gamma_{\max.} \dfrac{\cos 2\delta \tan \delta}{2\cos^2 \delta} =$ $$\frac{\cos 60 \tan 30}{2\cos^2 30} = \frac{\frac{1}{2} \cdot \frac{\sqrt{3}}{3}}{2 \cdot \frac{3}{4}} = \frac{\sqrt{3}}{9}$$

$$\boxed{\gamma_{\max.} \cong 11°}$$

Since the vertical field of view of the screen 1 is restricted as compared to that of a normal screen, which propagates in all directions from its surface, there is intensification of the image. Thus, the equivalent amount of light, for it is nowhere absorbed, is projected down a narrow viewing cone and provides greater illumination at the eye of an observer at 3.

Figure 7:
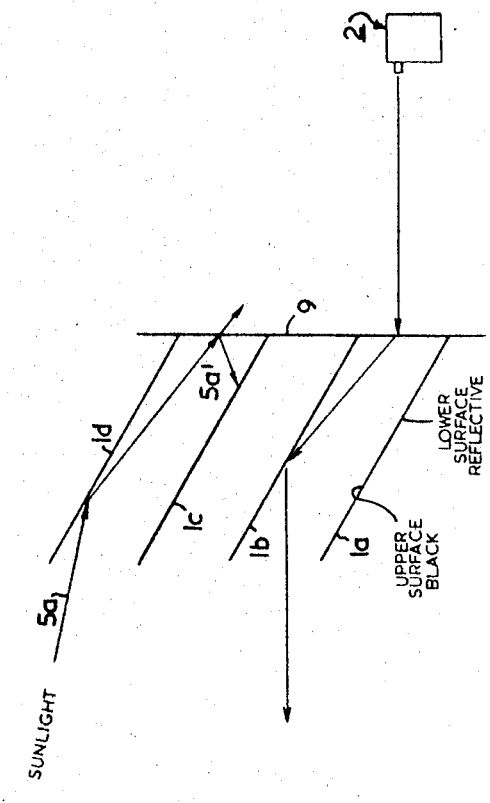
FIG. 7 is a further embodiment of the invention including a translucent member behind the screen.

As stated hereinbefore the invention envisages using an alternate design wherein the screen includes not only a series of strips having layer surfaces reflective but also a translucent screen 9 lying parallel to and adjacent to the strip screen, on the projector side of it, as shown in FIG. 7.

In this embodiment, the strips have black or non-reflective upper surfaces, and their lower surfaces are mirrored. Although the translucent sheet 9 does provide some reflective surface for sunlight, as shown at 5a, or for other extraneous incident light from the viewer's side, the non-reflective upper surfaces of the strips effectively absorb this unwanted light.

Figure 8:
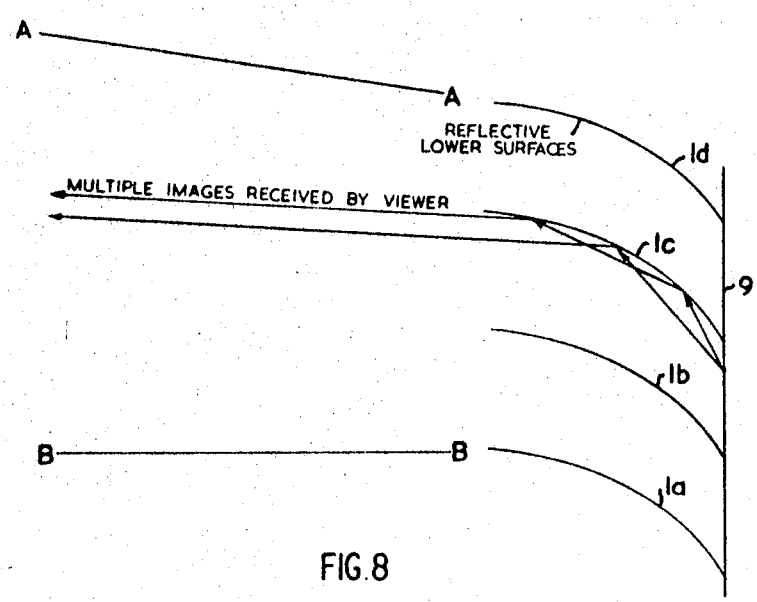
FIG. 8 is a further embodiment of the spresent invention wherein the individual strips are arcuate in cross-section.

Referring now to FIG. 8 there is shown a similar embodiment to that of FIG. 7 excepting that the strips are of curved cross-section. This embodiment not only transmits the image to the viewer but intensifies it in the process and the field of view extends only from line A—A to line B—B. The intensification of the image is particularly pronounced with this curved strip screen, because it is capable of "multiplying" the image with a series of reflections from the mirrored surfaces.

Referring now to FIG. 9 there is shown a further embodiment wherein the strips 1a, 1b and 1c, etc. are separated by spacing elements 10 disposed in co-extensive and parallel arrangement and each perpendicular both to the operative surfaces of the strips and to the plane of the screen thereby forming a matrix of rectangular or square shaped tubes or zones. Further, the strips may be divided into discrete and separable portions whereby pairs of such portions from adjacent strips form a pair of sides of such tubes. The entire screen may by this means be manufactured by nesting a plurality of such rectangular or square shaped tubes.

Referring now to FIG. 10 there is shown a further embodiment wherein one pair of adjacent strip such as 1a and 1b comprises a plurality of tubes 11. Each of the tubes provides elongate zones which are concave in a direction parallel to the plane of said screen. Thus the lower concave zone presents an operative surface upon which image forming light from the projector impinges while the upper concave zone presents an operative surface from which emerges the image seen by the viewer.

The respective concave zones, which may be semi-circular, semi-elliptic or otherwise, may be aligned to form two halves of associated tubes, which tubes may be separable and in the embodiment of FIG. 9.

While the novel screen has been described with predominant reference to front viewing of the screen, it will be obvious that since the cascade of strips have selected reflectivities an image will be seen from the rear or projector side of the screen. Although the image seen from the rear of the screen will be laterally reversed there will be certain applications whereon such reversal would not be an impediment. Concurrent viewing of the screen from both sides enables a large viewing audience to be disposed in a limited area. Screens built in accordance with the present invention exhibit exceptional quality from the front and perfectly acceptable quality from the rear.

The method and materials used in the construction of the novel screen will depend on the size of the screen and the environment in which the screen will be used.

A small screen comprises a cascade of plastic strips stretched between a supporting frame. Such strips may be formed of a plastic material, light metal or even glass. For larger screens, particularly those liable to wind loads the strips may be formed in metal and, intermediate the ends of the strips, spacers may be provided to ensure relative freedom from oscillation. Regardless of the size of the screen the reflective surfaces may be formed by spraying, electrochemical deposition, anodizing, cladding, polishing or the like.

The screen has an almost infinite number of applications, in situations where it is impractical or undesirable to darken the surroundings, or in dark environments. In particular it can be used:

(a) in classroom, office, factory or out-of-doors as a teaching aid;
(b) for daylight advertising upon billboards, shop-window displays, interior of stores . . . anywhere it is desirable to have illuminated in-motion or easily changeable or fixed still images;
(c) for drive-in theatres;
(d) for television screens, including a picture tube embodying easy daylight viewing in the absence of reflections;
(e) etc.

It has been found that a screen operating in accordance with the foregoing disclosure may be constructed whereby the individual strips may be spaced apart on a surface which is not planar, but having cylindrical curvature generated from an axis disposed in the region of the projector, and having a direction substantially parallel to the strips.

While the invention has been described with reference to particular embodiments, other embodiments falling within the terms of the appended claims will occur to those skilled in the art of optical projection.

I claim:

1. An optical screen for use in a rear projection type system comprising a plurality of similarly shaped light impervious members providing a plurality of adjacent first and second operative surfaces the latter being spaced apart in face-to-face relationship to define air spaces therebetween for the transmission of light therethrough, said surfaces having marginal edges, said surfaces and said edges being so arranged as to collectively define a front and a rear operative face of said screen, all of said first surfaces being disposed at a selected angle to one of said faces, and all of said second surfaces being similarly inclined at an angle complementary to the angle of the first surfaces, said first and second operative surfaces having selected reflectivities, the construction and arrangement of said members providing for the formation of an image on one of said faces of said screen when an image is projected from the opposite side of said screen to the other of said faces thereof.

2. An optical screen as defined in claim 1 wherein said selected angle is 60° measured between said rear face and said first surface.

3. An optical screen as defined in claim 1 wherein each of said pairs of operative surfaces are spaced apart by $x$ linear units measured parallel to said faces and wherein each of said operative surfaces have a width, measured between said marginal edges, equal to $3x$ units.

4. An optical screen as defined in claim 1 wherein said first operative surface is light diffusive.

5. An optical screen as defined in claim 1 wherein each of said first and second operative surfaces are light diffusive.

6. An optical screen as defined in claim 1 further including a translucent sheet disposed parallel to said screen adjacent the rear face thereof, said sheet having surfaces of low reflectivity.

7. An optical screen as defined in claim 1 wherein said surfaces are individually of arcuate configuration in a direction normal to said longitudinal marginal edges.

8. An optical screen as defined in claim 1 wherein said selected angle is $(90-\delta)$ degrees to said rear face, wherein said selected spacing is $x$ units and wherein said surfaces have a width of L units measured normal to said marginal edges, whereby L is given by:

$$L = 2x \cos \delta \cos \delta$$

9. An optical screen as defined in claim 8 wherein the line of sight between the front face of said screen and a viewer is an acute angle of $(90-\gamma)$, where $\gamma$, defining an angle of depression, is given by:

$$\tan \gamma = \tan \delta - \frac{\tan \delta}{2 \cos^2 \delta}$$

10. An optical screen as defined in claim 9 wherein the maximum angle of depression $\gamma_{max}$ is given by:

$$\tan \gamma_{max} = \frac{\cos 2\delta \tan \delta}{2 \cos^2 \delta}$$

11. An optical screen as defined in claim 10 wherein the maximum of angle of depression $\gamma_{max}$ is approximately 11°.

12. An optical screen as defined in claim 1 further including a plurality of spacing elements disposed in coextensive and parallel arrangements between said pairs of adjacent operative surfaces and each further disposed substantially perpendicular both to the operative surfaces thereof and to the said faces, thereby forming together with said strips a matrix of rectangular tubular apertures.

13. An optical screen as defined in claim 12 wherein said surfaces are divided into a plurality of discrete and separable portions and wherein said spacing elements and said discrete portions of said surfaces form a plurality of tubular zones.

14. An optical screen as defined in claim 1, wherein said rear face of said screen is of cylindrical configuration, said cylinder having an axis of generation located adjacent the associated projector and disposed substantially parallel to said marginal edges.

15. An optical screen for use in a rear projection type system comprising a plurality of similarly shaped tubular members formed of a light-impervious material which members provide a plurality of adjacent first and second operative surfaces the latter being spaced apart in face-to-face relationship to define air spaces therebetween for the transmission of light therethrough, said tubular members having first and second ends thereof collectively defining a front and a rear operative face of said screen, all of said first surfaces being disposed at a selected angle to one of said faces, and all of said second surfaces being similarly inclined at an angle complementary to the angle of the first surfaces, said first and second operative surfaces having selected reflectivities, the construction and arrangement of said members providing for the formation of an image on one of said faces of said screen when an image is projected from the opposite side of said screen to the other of said faces thereof.

16. An optical screen as defined in claim 15 wherein each tubular member is substantially circular and whereing said operative surfaces are of substantially arcuate configuration.

References Cited

UNITED STATES PATENTS

| | | | |
|---|---|---|---|
| 2,132,904 | 10/1938 | Martinez et al. | 350—120 |
| 2,931,269 | 4/1960 | St. Genies | 350—117 |
| 3,043,910 | 7/1962 | Hicks | 178—7.85 |
| 3,257,900 | 6/1966 | Goodbar et al. | 350—129 |

JULIA E. COINER, Primary Examiner

U.S. Cl. X.R.

350—119, 125